United States Patent
Lie et al.

(10) Patent No.: US 8,345,803 B2
(45) Date of Patent: Jan. 1, 2013

(54) OPTIMIZED FINGER ASSIGNMENT FOR IMPROVED MULTICARRIER THROUGHPUT

(75) Inventors: Gregory R. Lie, San Diego, CA (US); Abhay A. Joshi, San Diego, CA (US); Yu-Chuan G. Lin, Carlsbad, CA (US); Lijun Lin, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 828 days.

(21) Appl. No.: 12/244,516

(22) Filed: Oct. 2, 2008

(65) Prior Publication Data
US 2010/0086088 A1 Apr. 8, 2010

(51) Int. Cl.
*H04L 27/00* (2006.01)
(52) U.S. Cl. .................. 375/324; 375/316
(58) Field of Classification Search ............ 375/324, 375/260
See application file for complete search history.

(56) References Cited

U.S. PATENT DOCUMENTS

| | | | | |
|---|---|---|---|---|
| 5,903,550 A * | 5/1999 | Spock | ........................... | 370/335 |
| 6,539,005 B1 * | 3/2003 | Kim et al. | ..................... | 370/335 |
| 2003/0117989 A1 * | 6/2003 | Kim | ................................ | 370/342 |
| 2004/0121754 A1 * | 6/2004 | Tenda | ........................... | 455/334 |
| 2004/0259565 A1 * | 12/2004 | Lucidarme | .................... | 455/453 |
| 2005/0018784 A1 * | 1/2005 | Kurobe et al. | ................ | 375/260 |
| 2005/0071072 A1 | 3/2005 | Mangelsdorf | | |
| 2005/0113142 A1 * | 5/2005 | Felter | ......................... | 455/562.1 |
| 2005/0185702 A1 * | 8/2005 | Bonhomme | .................. | 375/148 |
| 2006/0203894 A1 * | 9/2006 | Ventola | ......................... | 375/148 |
| 2007/0109956 A1 * | 5/2007 | Kwon et al. | .................. | 370/208 |
| 2009/0060015 A1 * | 3/2009 | Beadle | .......................... | 375/227 |
| 2009/0092175 A1 * | 4/2009 | Oura | ............................. | 375/148 |
| 2009/0131011 A1 * | 5/2009 | Asokan | ......................... | 455/347 |
| 2009/0149134 A1 * | 6/2009 | Gunnarsson et al. | ........... | 455/69 |
| 2009/0252246 A1 * | 10/2009 | Lee et al. | ...................... | 375/262 |
| 2011/0158180 A1 * | 6/2011 | Melis et al. | ................... | 370/328 |

FOREIGN PATENT DOCUMENTS

| | | |
|---|---|---|
| WO | WO0152468 A1 | 7/2001 |
| WO | WO0203556 A2 | 1/2002 |
| WO | WO2006043865 | 4/2006 |
| WO | WO2007027052 | 3/2007 |

OTHER PUBLICATIONS

International Search Report & Written Opinion—PCT/US2008/080217, International Search Authority—European Patent Office—Jun. 18, 2009.
Taiwan Search Report—TW097140058—TIPO—Feb. 7, 2007.

\* cited by examiner

*Primary Examiner* — David Ometz
*Assistant Examiner* — Santiago Garcia
(74) *Attorney, Agent, or Firm* — Florin C. Corie

(57) ABSTRACT

Systems and methodologies are described that facilitate dynamically allocating demodulation resources of a wideband receiver to provide improved demodulation of simultaneously received signals. Signal-to-noise ratio (SNR) and/or packet error rate (PER) can be measured for the plurality of carriers to determine which demodulators related to the carriers require more resources than others to demodulate signals at a specified signal quality. Where the SNR of a related carrier is high and/or PER is low, the demodulator can require fewer resources than where the SNR of a related carrier is low and/or PER is high. In this regard, the resources are dynamically allocated among the demodulators and reallocated where SNR/PER changes and/or additional resources are made available.

31 Claims, 9 Drawing Sheets

OPTIMIZED FINGER ASSIGNMENT FOR IMPROVED MULTICARRIER THROUGHPUT

BACKGROUND

I. Field

The following description relates generally to wireless communications, and more particularly to finger assignment in multicarrier wireless communication receivers.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Moreover, mobile devices and/or base stations can employ wideband transceivers (e.g., rake receivers) that receive information on multiple frequencies at simultaneous time periods. Each receiver of the wideband transceiver or rake has fixed resources that are utilized to demodulate data received on the given receiver. Using such transceivers, the mobile devices and/or base stations can simultaneously receive and demodulate information coming from a number of sources, resulting in increased overall data throughput.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating dynamic resource assignment over multiple receivers of a multicarrier transceiver to provide increased throughput thereover. According to one example, resources can be allocated based at least in part on determining a level of throughput for the multiple receivers given an allocation. This can be based in part on a quality measurement of a carrier, such as signal-to-noise ratio (SNR) or packet error rate (PER) of the carriers being received, for example. Using the SNR and/or PER, a desired level of resources can be determined for receiving each carrier, and the resources can be accordingly allocated to the available receivers.

According to related aspects, a method for dynamically allocating demodulation resources for a wideband wireless communication receiver is provided. The method includes receiving a plurality of quality measurements related to a plurality of frequency carriers over which signals are received. In addition, the method includes comparing the quality measurements to determine an allocation of resources to a plurality of demodulators for demodulating the signals at an increased total throughput and allocating the resources to the demodulators according to the allocation.

Another aspect relates to a wireless communications apparatus. The wireless communications apparatus can include at least one processor configured to determine SNRs and/or PERs for a plurality of carriers over which signals are received and demodulated and dynamically allocate resources to a plurality of demodulators affecting the SNRs and/or PERs to determine an appropriate allocation. The processor is further configured to demodulate the signals over the demodulators utilizing the appropriate allocation.

Yet another aspect relates to a wireless communications apparatus that facilitates dynamic allocation of multicarrier receiver demodulation resources. The wireless communications apparatus can comprise means for receiving quality measurements of a plurality of carriers over which signals are received. The wireless communications apparatus can additionally include means for allocating demodulation resources to a plurality of demodulators, each of which relate to one of the plurality of carriers, based at least in part on the quality measurements of the plurality of carriers to improve overall throughput.

Still another aspect relates to a computer program product, which can have a computer-readable medium including code for causing at least one computer to receive a plurality of SNR and/or PER related to a plurality of carriers over which signals are received. The computer-readable medium can also comprise code for causing the at least one computer to compare the plurality of SNRs and/or PERs to determine an allocation of resources to a plurality of demodulators for demodulating the signals at an increased total throughput. Moreover, the computer-readable medium can comprise code for causing the at least one computer to allocate the resources to the demodulators according to the allocation.

Another aspect relates to an apparatus. The apparatus comprises an SNR/PER measurer that measures SNR and/or PER of a plurality of frequency carriers over which signals are received as well as a finger allocator that compares the SNR and/or PER of the plurality of receivers to determine an appropriate allocation of demodulation fingers to a plurality of demodulators for demodulating the signals.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
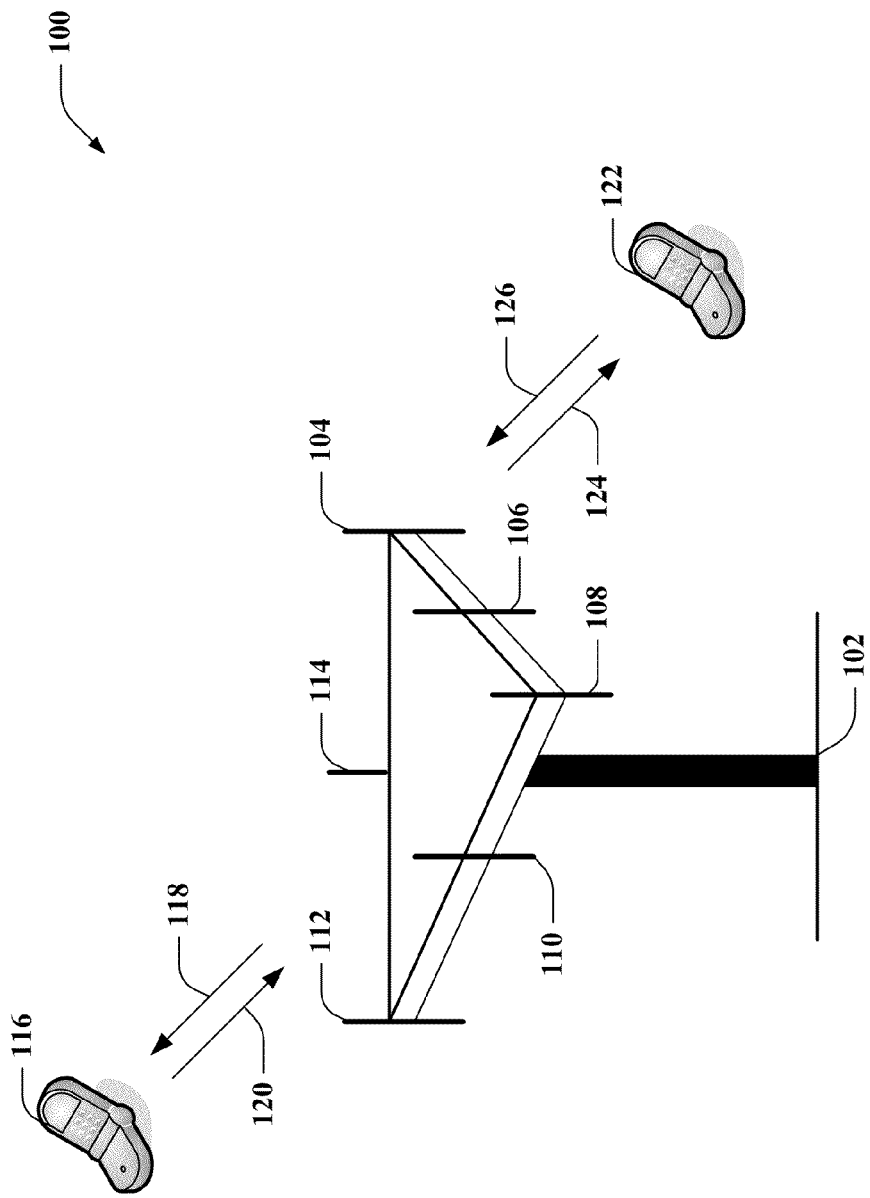
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. In one example, the base station 102 and/or mobile devices 116/122 can receive information from each other and/or additional mobile devices/base stations by employing a wideband multicarrier transceiver (e.g., rake receiver), which can be integrated or otherwise. For example, the wideband multicarrier transceiver (not shown) can comprise multiple receivers that simultaneously receive signals from disparate frequencies. Thus, increased throughput is achieved by the base station 102 and/or mobile devices 116/122, as it can receive and demodulate multiple signals over a given time period. Moreover, the base station 102 and/or mobile devices 116/122 can dynamically allocate resources to the receiver for improved configuration. In one example, the resources can be dynamically allocated based at least in part on a change in quality measurement of one or more carriers. The quality measurements can be signal-to-noise ratio (SNR), packet error rate (PER), other energy and/or interference measurements, etc.

In wireless communications, received signals can have differing SNRs. Many factors can contribute to SNR, including transmitted signals reflecting off of or otherwise encountering various obstacles, position of a utilized frequency in the frequency spectrum, and/or the like. Furthermore, the SNR can be determined based at least in part on an energy of the signal, multipaths created and properly received for the signal, as well as available resources for demodulating the signal and/or multipaths. Where a signal has a high SNR, it may generate a lesser number of multipaths to decode, thus a lesser amount of resources may be required to effectively demodulate the signal for interpretation of data comprised in the signal. Thus, the base station 102 and/or wireless devices 116/122 can measure or estimate SNR as a quality measurement for the multiple received signals based on a number of multipaths received for the signals. Additionally, the wireless devices 116/122 can compare the SNRs, and proportionally allocate available resources to the receivers. In another example, PER measurement over a carrier can be utilized as a quality measurement of the carrier to allocate available resources. In yet another example, similar proportional time-based allocation of resources for decoding the demodulated signals can be provided. In this regard, improved performance of the wideband multicarrier receiver can be achieved.

Figure 2:
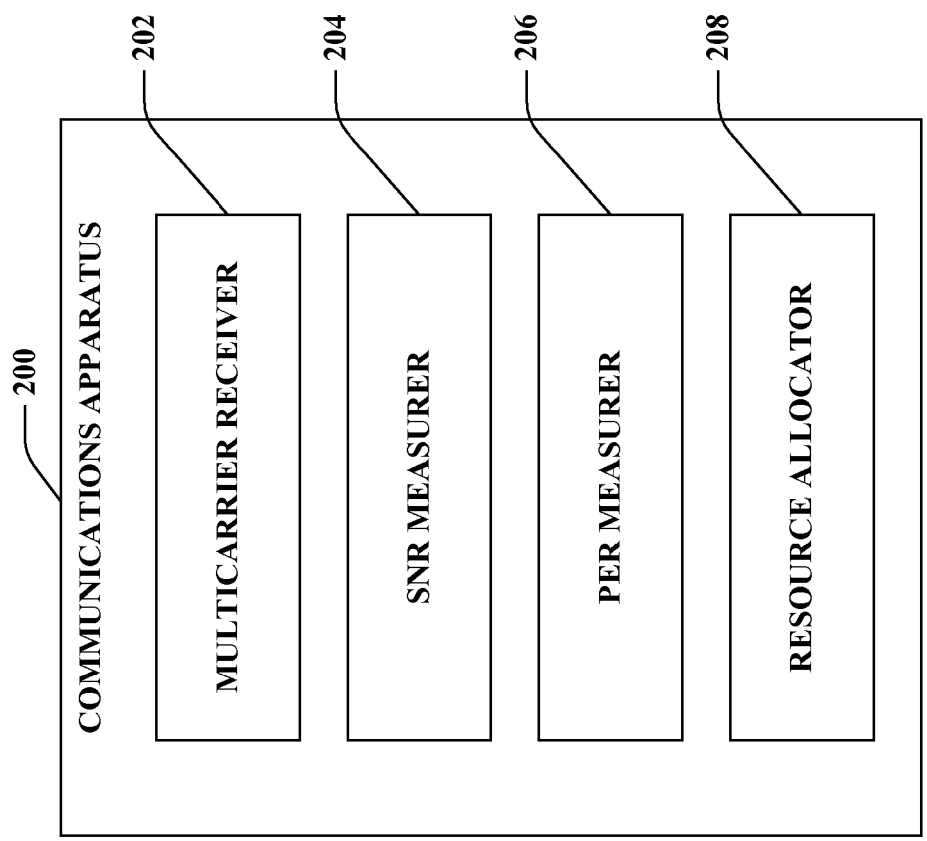
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a multicarrier receiver 202 that can simultaneously receive multiple signals over disparate frequency carriers, a SNR measurer 204 that can determine SNR for signals received over the carriers, and a resource allocator 206 that can determine an optimal resource allocation for demodulating the received signals. In one example, the multicarrier receiver 202 can receive a plurality of signals of disparate frequency from one or more devices (e.g., over a plurality of receivers comprised within the multicarrier receiver 202). The SNR measurer 204 can determine SNR of the signals and/or other signals related to the frequencies of the signals, such as a pilot signal, as well as available demodulation resources, a PER measurer 206 that can determine PER for the signals, and the resource allocator 208 can proportion resources for demodulating and/or decoding the signals with improved overall throughput.

According to an example, the SNR measurer 204 can determine SNR for signals received over one or more carriers by evaluating a pilot signal received over the one or more carriers by the multicarrier receiver 202 along with a number of available resources for demodulating the signal. The measured SNR can be utilized to determine a data rate for signal transmission. It is to be appreciated that SNR can vary over a carrier based on multiple factors, including signal propagation characteristics of the frequency, differences in presently interfering frequency jammers, differences in demodulation characteristics for the frequency at the receiver, and/or the like. Moreover, a data rate for signal transmission over a carrier can change non-linearly; for example, a 2 decibel increase at a low SNR may not yield the same increase in data rate as a 2 decibel increase at a high SNR.

In this regard, the SNR measurer 204 determines SNR for signals received over each carrier in the multicarrier receiver 202 at a given time based on resources available to demodulate the signals. The resource allocator 208 can subsequently compare SNR of the carriers utilizing various demodulation resource allocations to determine an appropriate allocation for demodulating signals received over the carriers to improve overall throughput of the communications apparatus 200. Such dynamic allocation of resources allows for improved demodulation of signals received simultaneously over the carriers. In one example, the resources can be demodulation fingers available to each receiver, which can be a collection of resources utilized to demodulate a given multipath of a signal received over a carrier corresponding to the receiver. Following demodulation, results from the disparate fingers for a receiver, which are demodulating different multipaths of the same carrier, can be combined to interpret the received signal. Thus, the fingers are dynamically allocated to achieve improved demodulation of multiple frequency carriers.

In addition, once resources are allocated, the SNR of a signal, as described, can change according to various factors; the changes can occur in real-time. Thus, the SNR measurer 204 can continue to measure SNR of the signals based on the current resources allocation by the multicarrier receiver 202. If a quality measurement (e.g., signal quality, SNR, PER, etc.) changes for one of the signals such that reallocating resources can result in an improved overall throughput for the communications apparatus 200, for example, the resource allocator 208 can reallocate resources from one signal to another to accommodate the change. In the example above, where fingers are allocated to a plurality of receivers, if the SNR of one signal received over a carrier drops below a threshold (e.g., due to a signal degradation), fingers can be allocated to the receiver from a receiver receiving a signal with higher SNR. Similarly, where SNR improves for a signal received over a carrier (e.g., due to signal improvement and/or decrease in a number of multipaths), resources can be reallocated to receivers receiving disparate signals with lower SNR to provide improved total throughput for the multicarrier receiver 202. It is to be appreciated that resources can be allocated upon other events as well, such as resources being released by one or more of the receivers.

In another example, the packet error rate measurer 206 can determine a PER of the one or more carriers. This can be based on measuring PER based on one or more received signals (such as a pilot signal), for example. Where a carrier exhibits higher PER than another, the resource allocator 208 can allocate more demodulation resources for demodulating signals received over that carrier. In addition, where a change in PER is detected, the resource allocator 208 can shift resources (e.g., among demodulation fingers) to allow for improved demodulation of simultaneously received signals, for example instead of decreasing data throughput rate of the carriers. Moreover, time-based decoding resources can be similarly allocated by the resource allocator 208. For example, the resource allocator 208 can allocate more decoding resources to carriers having higher throughput as opposed to those with lower throughput to allow efficient decoding of symbols demodulated from the signals.

Figure 3:
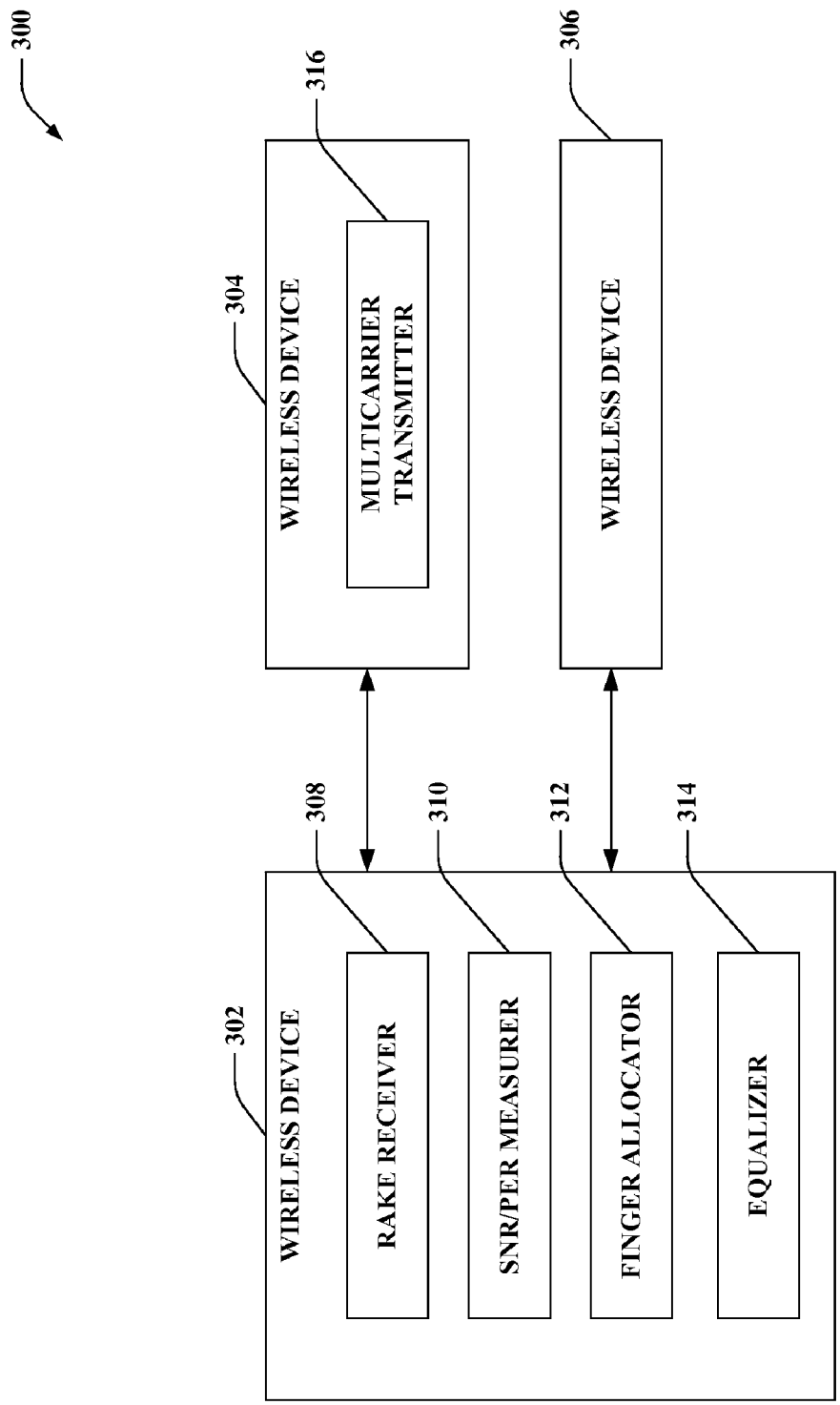
FIG. 3 is an illustration of an example wireless communications system that effectuates dynamic allocation of demodulation resources for a rake receiver.

Now referring to FIG. 3, illustrated is a wireless communications system 300 that can dynamically allocate demodulation resources for a multicarrier receiver. Each wireless device 302, 304, and 306 can be a base station, mobile device, or portion thereof. In one example, wireless device 302 can transmit information to wireless device 304 and/or 306 over a forward link or downlink channel; further wireless device 302 can receive information from wireless device 304 and/or 306 over a reverse link or uplink channel, or vice versa. Moreover, system 300 can be a MIMO system, and the wireless devices 302, 304, and 306 can simultaneously communicate with each other over multiple carriers. Also, the components and functionalities shown and described below in the wireless device 302 can be present in the wireless device 304 and/or 306 as well and vice versa, in one example; the configuration depicted excludes these components for ease of explanation.

Wireless device 302 includes an rake receiver 308 that can simultaneously receive signals from a plurality of frequency carriers, a SNR/PER measurer 310 that can determine a SNR, PER, and/or other quality measurements for the plurality of frequency carriers, a finger allocator 312 that can divide demodulation fingers (or other resources) among receivers in the rake receiver 308 according to SNR, PER, and/or other quality measurements, and an equalizer 314 that can be utilized to receive information received over a stationary channel with high SNR. According to an example, utilizing an equalizer 314 can free demodulation fingers (or other resources) on the rake receiver 308 for use with other receivers thereof since the equalizer 314 communicates at extremely high SNR over the stationary channel when the wireless device 302 is in close proximity to the wireless device 304 and/or 306.

The wireless device 304 includes a multicarrier transmitter 316 that can be utilized to simultaneously transmit multiple signals over multiple carriers for increased transmission throughput. According to an example, the multicarrier transmitter 316 can simultaneously transmit one or more signals over the multiple transmitters, which can be received in full or in part by the rake receiver 308. In addition, the wireless device 306 can transmit one or more signals, which can also be received by the rake receiver 308 over disparate frequencies. The SNR/PER measurer 310 can measure the SNR and/or a PER over frequencies based at least in part on pilot signals transmitted thereover by the wireless device 304 and/or 306. For example, frequencies for which signals require an increased amount of resources to demodulate a number of multipaths to achieve a signal quality can have lower SNR than those for which a lesser amount of resources is required to achieve a similar signal quality. The finger allocator 312 can provide finger demodulation resources for the signals, as described, according to the SNR/PER measurements. Thus, the finger allocator 312 can provide more demodulation fingers to receivers of the rake receiver 308 receiving signals over carriers exhibiting lower SNR according to the pilot signal measurement and/or higher PER than other carriers, for example.

Moreover, as described, the SNR/PER measurer 310 can monitor the SNR/PER on the various carriers. Where SNR and/or PER changes beyond a threshold for a given carrier, the finger allocator 312 can remove demodulation fingers from one receiver of the rake receiver 308 and provide them to one or more other receivers of the rake receiver 308. For example, as described, if a receiver experiences a decrease in SNR measured from the pilot signal as described and/or an increase in PER for its related carrier, demodulation fingers can be taken from a receiver with higher SNR and/or lower PER and assigned to the receiver associated to the carrier with decreased SNR and/or higher PER. Similarly, where a receiver experiences an increase in SNR and/or decrease in PER, the finger allocator 312 can take demodulation fingers from it and reallocate them to a receiver experiencing lower SNR to raise the SNR by allocating additional resources for demodulating signals received thereover. Additionally or alternatively, resources can be reallocated to a receiver experiencing higher PER in a similar regard. Moreover, fingers can be reallocated when released by one or more receivers following use of the finger or if other fingers otherwise become available.

In one example, the finger allocator 312 can utilize a formula to project improvement in overall throughput by comparing resulting SNRs/PERs based on resource reallocation schemes. An example of the formula for choosing a carrier C for demodulation finger assignment, can be $$C = \mathrm{MAX}_i (R_i(SNR_i + SNR_{i,J_i}) - R_i(SNR_i)),$$

where $SNR_{i,j}$ is the SNR of the $j^{th}$ finger assigned to carrier i (where i=0, 1, 2, . . . , and j=0, 1, 2, . . . ), $J_i$ is the number of fingers currently assigned to carrier i, $SNR_i$ is the total SNR from carrier i where $$SNR_i = \sum_{j=0}^{J_i - 1} SNR_{i,j},$$

and $R_i(SNR)$ is the requested data rate on carrier i as a function of SNR. Thus, where a demodulation finger is available for allocation, the finger allocator 312 can determine the carrier exhibiting the highest value for the above formula and can allocate the available demodulation finger to the receiver receiving the carrier. In another example, the finger allocator 312 can determine a more optimal distribution of demodulation fingers using the formula. For example, the finger allocator 312 can determine a number of demodulation fingers to allocate to the individual receivers resulting in the most similar measurements of $R_i(SNR_i + SNR_{i,J_i}) - R_i(SNR_i)$ for each receiver with respect to the other receivers. Upon determining the configuration, the finger allocator 312 can adjust or reallocate the demodulation fingers among the receivers to match the determined configuration, in one example.

Moreover, as mentioned, an equalizer 314 can be utilized to receive one or more carriers. For example, where the wireless device 302 is close in proximity to the wireless device 304 and/or 306 and is receiving signals over a stationary channel, the equalizer 314 can be utilized instead of the rake receiver 308. In this implementation, the finger allocator 312 can bias carriers received via the rake receiver 308 over the equalizer 314 carriers for allocating demodulation fingers, as the signals received by the equalizer 314 can have high SNR.

Figure 4:
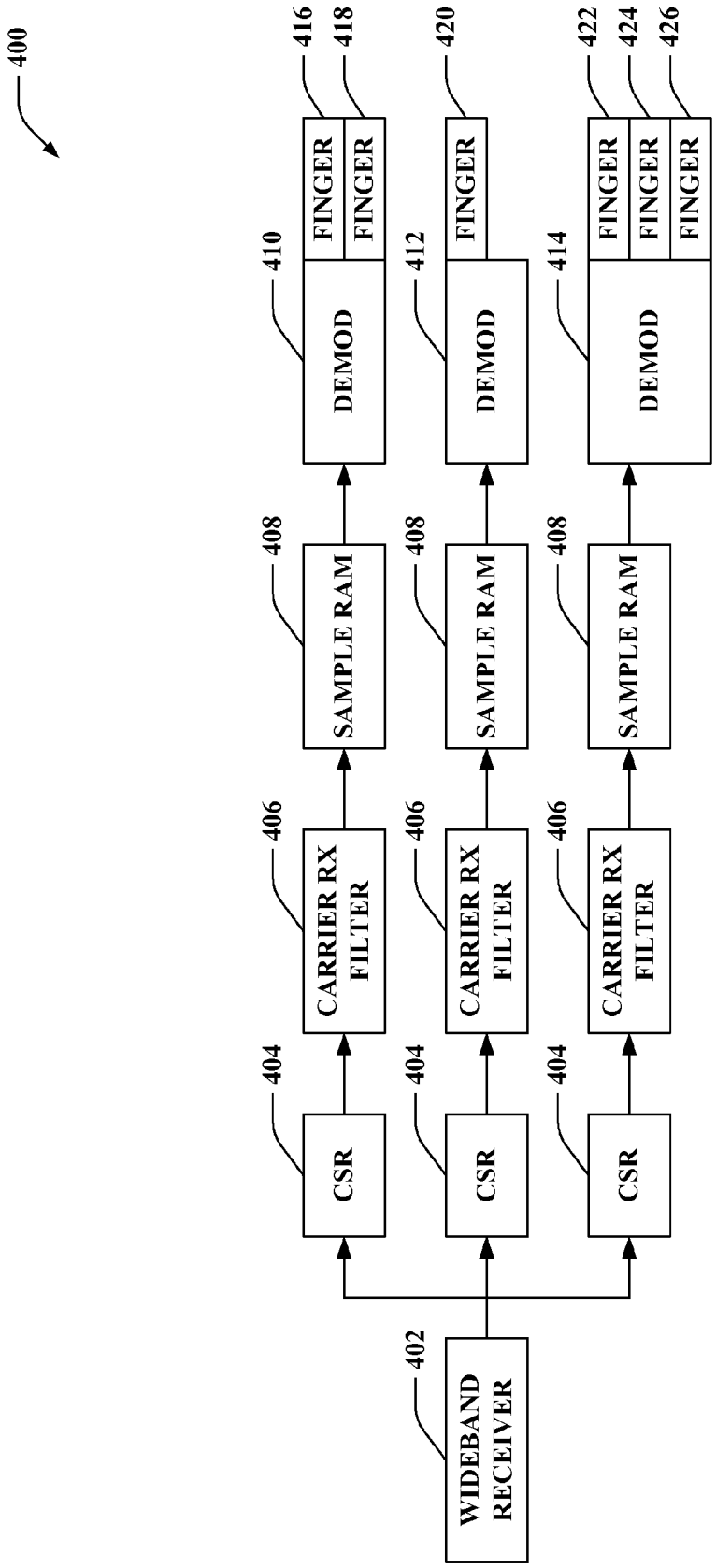
FIG. 4 is an illustration of an example multicarrier receiver that dynamically allocates demodulation resources.

Turning now to FIG. 4, illustrated is an example multicarrier receiver 400 for utilization in wireless communications networks. A wideband receiver 402 is provided that can simultaneously receive signals over multiple carriers. A plurality of channel selective repeaters (CSR) 404 are also provided that can repeat the signals received by the wideband receiver 402 along with a plurality of carrier receiver filters 406 that can filter signals received over a given carrier, for example, to in-phase/quadrature (I/Q) samples. Moreover, a plurality of sample random access memories (RAM) 408 are provided to store the filtered signals/samples for subsequent demodulation. Thus, a plurality of demodulators 410, 412, 414 are provided that can demodulate at least a portion of the signals received over the carriers. As shown, each demodulator 410, 412, 414 can be associated with one or more respective CSRs 404, carrier receiver filters 406, and sample RAMs 408. Additionally, each demodulator 410, 412, 414 can be respectively associated with one or more fingers 416-426 that can be utilized to demodulate multipaths of the signals, or samples thereof, received over the carriers as described herein.

According to an example, the wideband receiver 402 can receive a plurality of signals over a plurality of carriers. The CSRs 404 can selectively repeat portions of frequencies or channels, over which desired signals are transmitted, to the carrier receiver filters 406. The carrier receiver filters 406 can filter I/Q samples from the signals for storage in the respective sample RAMs 408. Once in the sample RAMs 408, the I/Q samples can be demodulated by a respective demodulator 410, 412, or 414. The demodulators 410, 412, 414 can utilize different technologies to demodulate the samples, in one example. Additionally, the demodulators 410, 412, 414 are each allocated one or more demodulation fingers 416-426, respectively, to demodulate given multipaths in the signal. As described, more fingers allow for enhanced demodulation, which can be helpful for signals with low SNR as the signals can have a higher number of multipaths for which demodulation is required to reach a desirable signal quality. In addition, the signals can have high PER. Thus, as described herein, the fingers 416-426 can be dynamically allocated among the demodulators 410, 412, 414 based at least in part on SNR and/or PER of the respective signals received by the wideband receiver.

In addition, fingers 416-426 can be dynamically reallocated from one demodulator to another. This can occur, for example, where a demodulator, such as demodulator 410, encounters a signal on a carrier below a threshold PER and/or SNR, as measured based on a number of multipaths required for achieving a given signal quality. In this example, if demodulator 412 and 414 can spare one or more fingers 420-426, the finger(s) can be reallocated to the demodulator 410 to demodulate another multipath of the signal. This can result in overall improved throughput for the wideband receiver 400. Similarly, where demodulator 410 receives a signal with high SNR (above a threshold) and/or low PER for demodulation, one or more of its fingers 416 and/or 418 can be reallocated to demodulator 412 or 414 if needed for demodulating another multipath based on the SNR and/or PER of the signal for those demodulators. It is to be appreciated that finger reallocation can be performed based on determining an allocation scheme that provides an improved distribution of resources based on SNR/PER of each carrier, as described supra. This can be performed utilizing the formula provided above, in one example, to measure resource need when determining where to allocate a finger.

In another example, the fingers can become available following use by one or more of the demodulators 410, 412, 414.

For example, demodulator 414 can release one or more fingers 422-426 when it has completed demodulation and/or when another demodulator needs a finger. In this case, the formula above can be utilized to determine whether allocation to demodulator 410 or 412 would be more optimal based at least in part on SNR/PER of signals received over related carriers. It is to be appreciated that the SNR/PER of each carrier can be determined by one or more components of the multicarrier receiver 400; the SNR/PER can be based on a pilot signal transmitted over the carriers, in one example as described. In another example, allocating and/or reallocating the fingers 416-426 can be performed by another offline finger.

Figure 5:
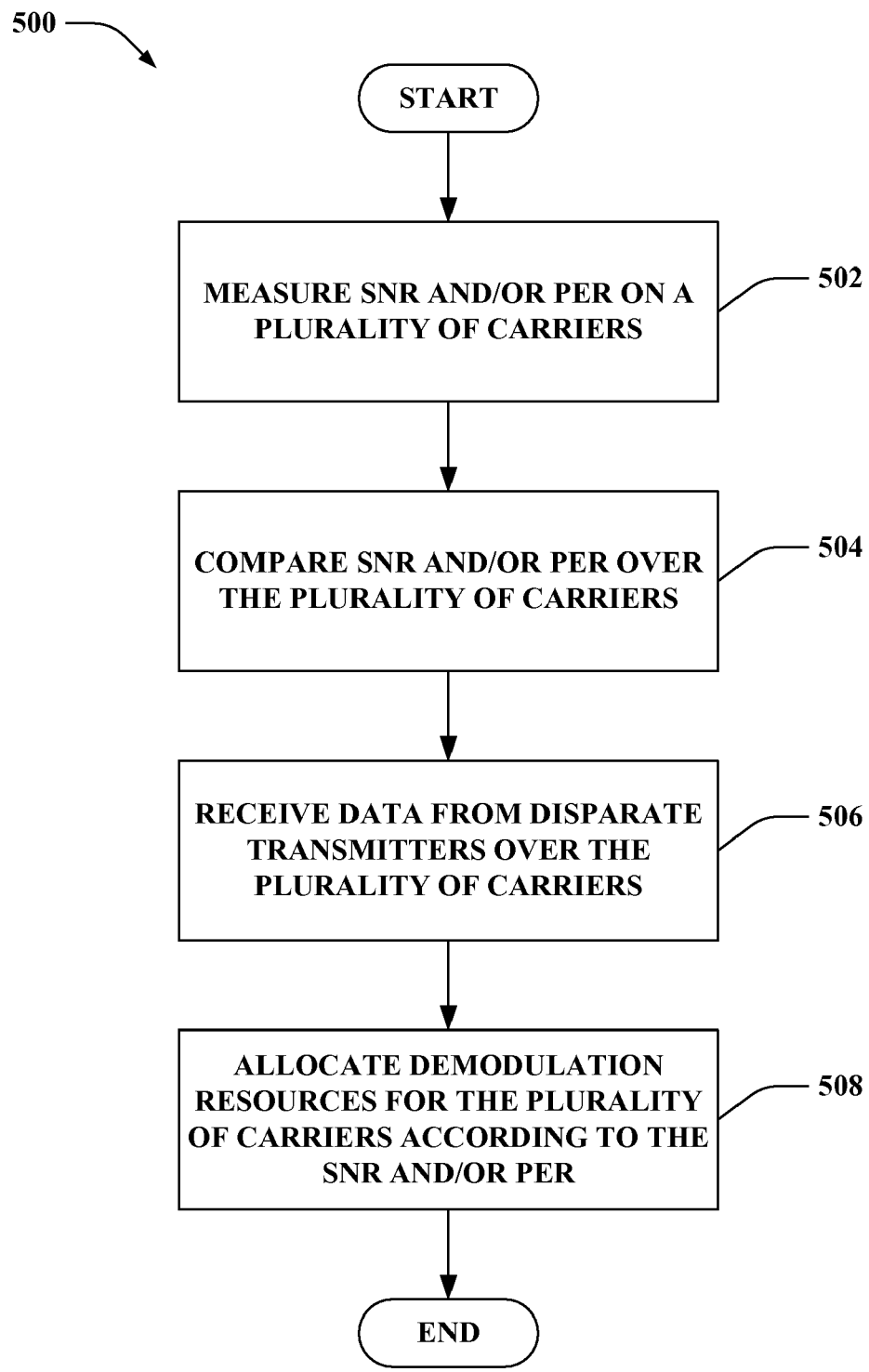
FIG. 5 is an illustration of an example methodology that facilitates allocating demodulation resources.
Figure 6:
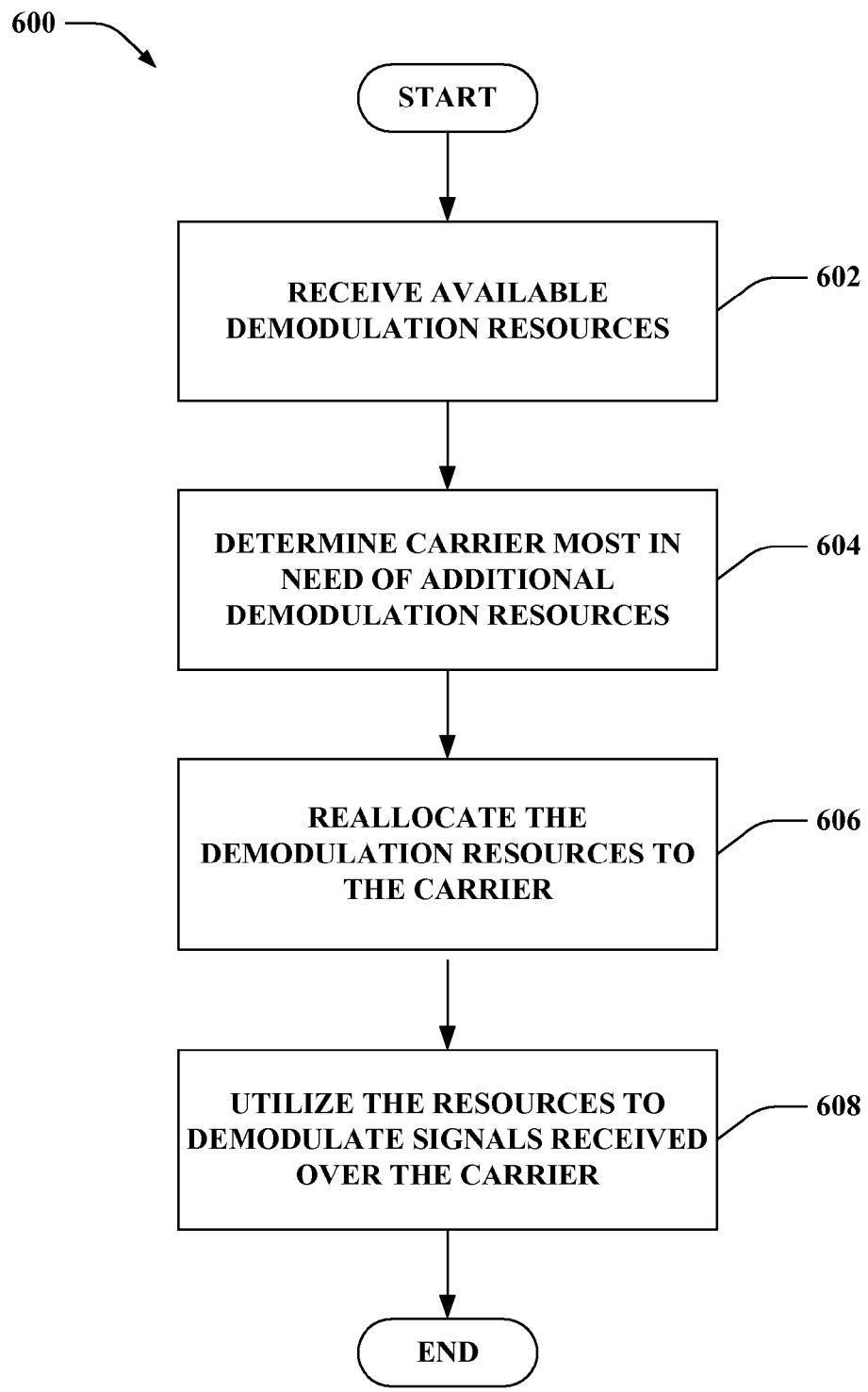
FIG. 6 is an illustration of an example methodology that facilitates allocating received available demodulation resources.

Referring to FIGS. 5-6, methodologies relating to dynamic allocation of demodulation fingers in wideband wireless communication receivers are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates allocating demodulation resources of a wideband receiver is displayed. At 502, SNR and/or PER is measured over a plurality of carriers. For example, as described, carriers can exhibit disparate SNR and/or PER with respect to a receiver based on a variety of factors, including signal propagation characteristics, jammers, demodulation characteristics at the receiver, etc. Thus, SNR/PER can be independently measured for each carrier as each can have different signal qualities as determined by earlier evaluation of a pilot signal, in one example. At 504, the SNRs and/or PERs can be compared over the plurality of carriers to determine which carriers have higher or lower SNRs/PERs, thus requiring less or more demodulation resources to demodulate a number of multipaths achieving a signal quality, as described. At 506, data is received from disparate transmitters over the plurality of carriers; the data can be one or more wireless communications signals, for example. At 508, demodulation resources can be allocated for the plurality of carriers according to the SNR and/or PER. Thus, as described, demodulators related to carriers having higher SNR and/or lower PER can receive less resources than those related to carriers having lower SNR and/or higher PER to provide improved overall throughput.

Turning to FIG. 6, illustrated is a methodology 600 that reallocates resources for multicarrier receiver demodulation. At 602, available demodulation resources are received. These can be fingers, as described above, or other processor/memory resources, for example. At 604, a carrier most in need of additional modulation resources can be determined. The carrier can be determined by comparing SNR and/or PER measurements of substantially all carriers related to a multicarrier received, as described. The comparison can include calculating the carrier most in need by utilizing the formulas presented above. At 606, the demodulation resources can be reallocated to the carrier most in need (e.g. based on the calculation) to improve overall throughput. At 608, the resources can be utilized to demodulate signals received over the carrier. In this regard, resources that come available (e.g., through a completed usage and/or upon detection of a need by one or more demodulators, as described) can be reallocated to provide improved total throughput.

It will be appreciated that, in accordance with one or more aspects described herein, inferences can be made regarding determining SNR and/or one or more carriers in need of additional resources as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can be made in determining when demodulation resource reallocation is beneficial to the receivers of the wideband transceiver and/or in measuring SNRs of the carriers based in part on available demodulation resources.

Figure 7:
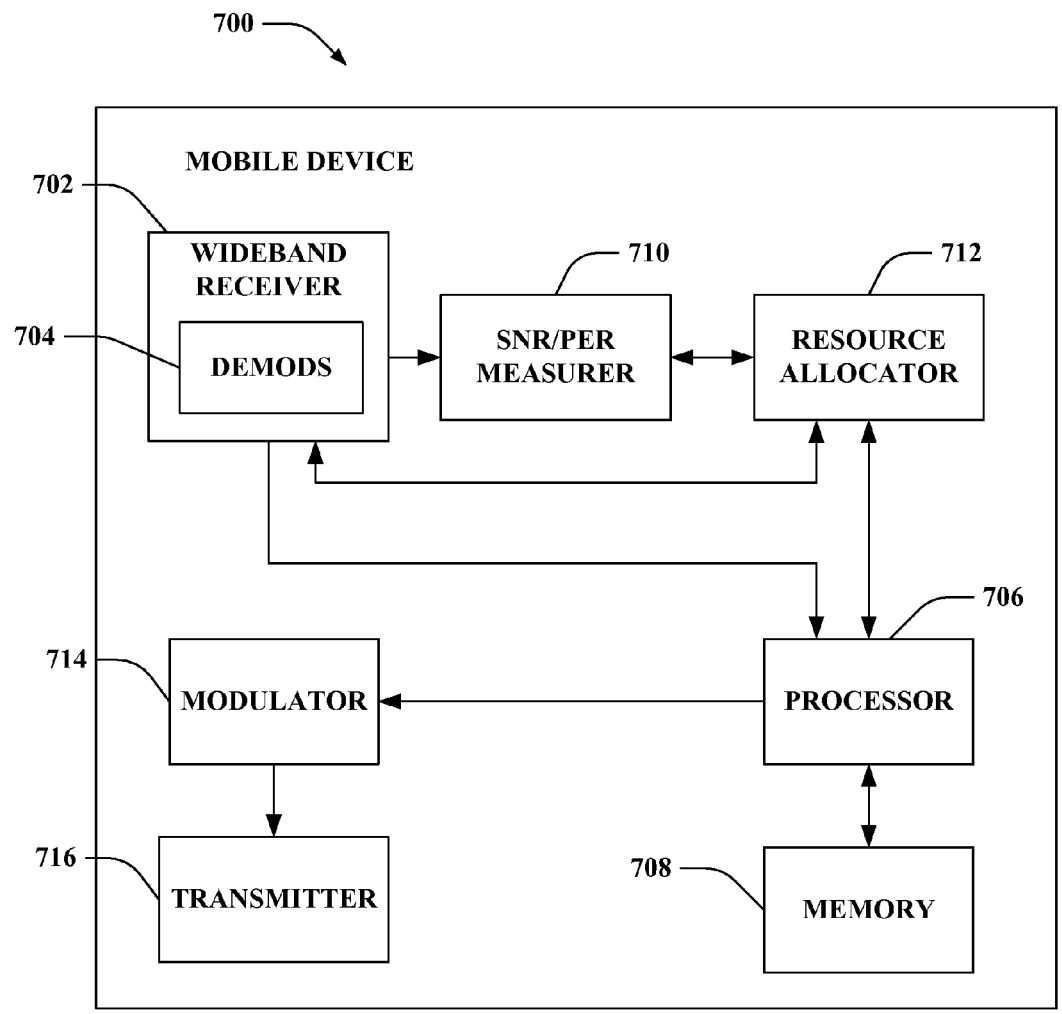
FIG. 7 is an illustration of an example mobile device that facilitates dynamically allocating and reallocating demodulation resources.

FIG. 7 is an illustration of a mobile device 700 that facilitates dynamic demodulation resource allocation for a wideband receiver. Mobile device 700 comprises a wideband receiver 702 that receives multiple signals from, for instance, one or more receive antennas (not shown), performs typical actions on (e.g., filters, amplifies, downconverts, etc.) the received signals, and digitizes the conditioned signals to obtain samples. Wideband receiver 702 can comprise a plurality of demodulators 704 that can demodulate received symbols from each signal and provide them to a processor 706 for channel estimation, as described herein. Processor 706 can be a processor dedicated to analyzing information received by wideband receiver 702 and/or generating information for transmission by a transmitter 716, a processor that controls one or more components of mobile device 700, and/or a processor that both analyzes information received by wideband receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES- DRAM), Synchlink DRAM (SLDRAM), and direct Rambus RAM (DRRAM). The memory 708 of the subject systems and methods is intended to comprise, without being limited to, these and any other suitable types of memory.

The wideband receiver 702 can further be operatively coupled to a SNR/PER measurer 710 that can determine SNR, PER, and/or other quality measurements of one or more carriers over which signals are received by the wideband receiver 702. As described, the SNR can be based on a number of factors and can vary for each given carrier. The wideband receiver 702 and/or processor 704 can further be coupled to a resource allocator 712 that can distribute demodulation resources to the demodulators 704. As described, the demodulators 704 can each interpret carriers with different SNR/PER such that proportional distribution of demodulation resources can allow for improved overall throughput of the wideband receiver 702, as described. Mobile device 700 still further comprises a modulator 714 and transmitter 716 that respectively modulate and transmit signal to, for instance, a base station, another mobile device, etc. Although depicted as being separate from the processor 706, it is to be appreciated that the SNR/PER measurer 710, resource allocator 712, demodulators 704, and/or modulator 714 can be part of the processor 706 or multiple processors (not shown).

Figure 8:
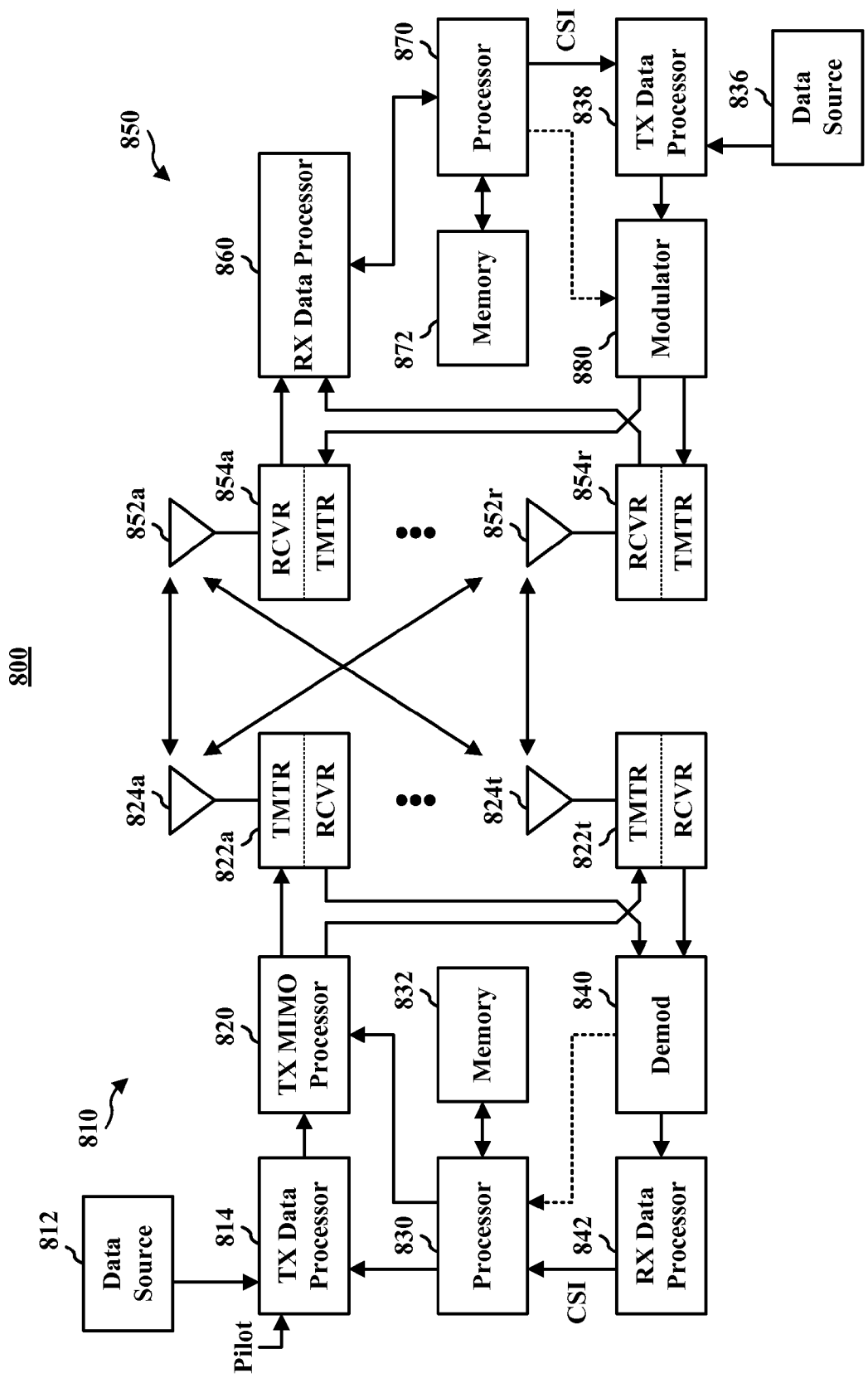
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-4 and 7) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which preceding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which preceding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
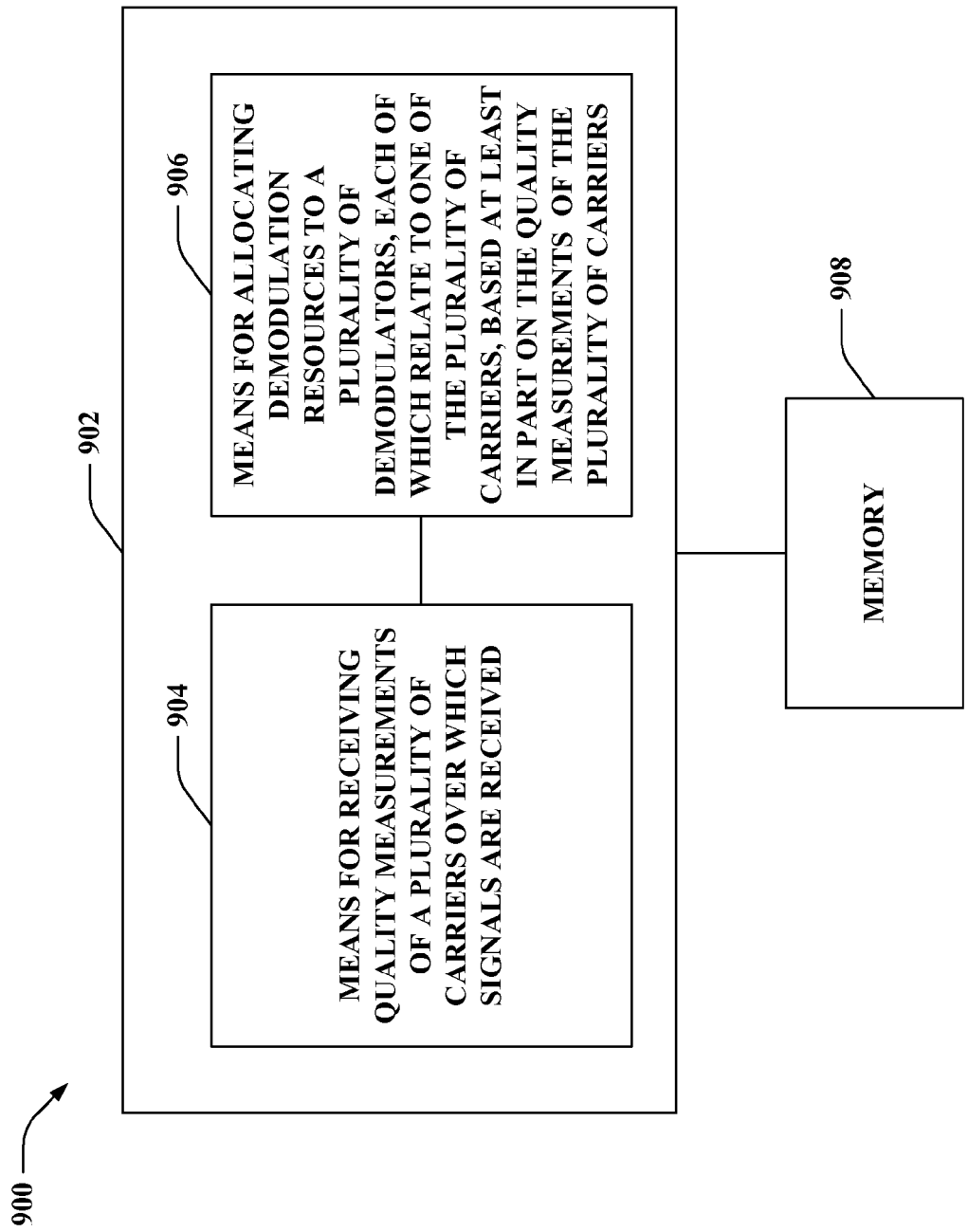
FIG. 9 is an illustration of an example system that dynamically allocates demodulation resources.

With reference to FIG. 9, illustrated is a system 900 that dynamically allocates resources of a wideband receiver for demodulating signals received thereover. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include means for receiving quality measurements of a plurality of carriers over which signals are received 904. For example, the quality measurements, as described, can be SNR, PER, etc. From the quality measurement, a difficulty of demodulating signals received over a carrier can be inferred. This can allow determination of an optimal resource allocation for demodulating the simultaneously received signals. Further, logical grouping 902 can comprise means for allocating demodulation resources to a plurality of demodulators, each of which relate to one of the plurality of carriers, based at least in part on the quality measurements of the plurality of carriers to improve overall throughput 906. Thus, as described, the allocation can be optimal based on comparison of the quality measurement for each carrier. Additionally, system 900 can include a memory 908 that retains instructions for executing functions associated with the means 904 and 906. While shown as being external to memory 908, it is to be understood that one or more of the means 904 and 906 can exist within memory 908.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for dynamically allocating demodulation resources for a wideband wireless communication receiver, comprising:
receiving a plurality of quality measurements related to a plurality of frequency carriers over which signals are received;
comparing the quality measurements to determine an allocation of resources to a plurality of demodulators for demodulating the signals at an increased total throughput;
allocating the resources to the demodulators according to the allocation; and
reallocating one or more demodulation fingers from a first demodulator to a second demodulator based at least in part on a projected change in overall throughput, wherein the projected change in overall throughput is projected based at least on a potential change in packet error rate (PER) of a frequency carrier related to the first demodulator.

2. The method of claim 1, wherein the quality measurement is a signal-to-noise ratio (SNR) determined from a signal transmitted over each of the plurality of frequency carriers and an amount of resources required to demodulate the signal according to a specified signal quality.

3. The method of claim 1, wherein the quality measurement is a packet error rate (PER) for data received over each of the plurality of carriers.

4. The method of claim 1, wherein the resources include a plurality of demodulation fingers assigned to the demodulators.

5. The method of claim 4, wherein the reallocating the one or more demodulation fingers further comprises reallocating from the first demodulator to the second demodulator based at least in part on a change in quality measurement of the frequency carrier related to the first demodulator and/or the second demodulator resulting in increased overall throughput.

6. The method of claim 5, wherein the one or more demodulation fingers are reallocated from the first demodulator to the second demodulator based at least in part on an increase in SNR of the frequency carrier related to the first demodulator.

7. The method of claim 5, wherein the one or more demodulation fingers are reallocated from the first demodulator to the second demodulator based at least in part on a decrease in SNR of the frequency carrier related to the second demodulator.

8. The method of claim 4, wherein the allocation is determined by an available offline demodulation finger.

9. The method of claim 1, wherein the resources are received from a demodulator assigned to demodulate one or more signals received over an equalizer.

10. The method of claim 1, further comprising allocating time-based decoding resources for decoding symbols received from demodulating the signals according to the allocation.

11. A wireless communications apparatus, comprising:
at least one processor configured to:
determine signal-to-noise ratios (SNR) and/or packet error rates (PER) for a plurality of carriers over which signals are received and demodulated;
dynamically allocate resources to a plurality of demodulators affecting the SNRs and/or PERs to determine an appropriate allocation for demodulating the signals at an increased total throughput;
demodulate the signals over the demodulators utilizing the appropriate allocation; and
reallocate one or more demodulation fingers from a first demodulator to a second demodulator based at least in part on a projected change in overall throughput, wherein the projected change in overall throughput is projected based at least on a potential change in packet error rate (PER) of a frequency carrier related to the first demodulator; and
a memory coupled to the at least one processor.

12. The apparatus of claim 11, wherein the resources include the one or more demodulation fingers assigned to the demodulators.

13. The apparatus of claim 12, wherein to reallocate one or more demodulation fingers the at least one processor is further configured to reallocate from the first demodulator to the second demodulator based at least in part on a change in quality measurement of the frequency carrier related to the first demodulator and/or the second demodulator resulting in increased overall throughput.

14. The apparatus of claim 11, wherein said at least one processor further allocates time-based decoding resources for decoding symbols received from demodulating the signals according to the allocation.

15. A wireless communications apparatus that facilitates dynamic allocation of multicarrier receiver demodulation resources, comprising:
means for receiving quality measurements of a plurality of carriers over which signals are received;
means for allocating demodulation resources to a plurality of demodulators, each of which relate to one of the plurality of carriers, based at least in part on the quality measurements of the plurality of carriers to improve overall throughput; and
means for reallocating one or more demodulation fingers from a first demodulator to a second demodulator based at least in part on a projected change in overall throughput, wherein the projected change in overall throughput is projected based at least on a potential change in packet error rate (PER) of a frequency carrier related to the first demodulator.

16. The apparatus of claim 15, wherein the quality measurement is a signal-to-noise ratio (SNR) determined from a signal transmitted over each of the plurality of carriers and an amount of resources required to demodulate the signal according to a specified signal quality.

17. The apparatus of claim 15, wherein the quality measurement is a packet error rate (PER) for data received over each of the plurality of carriers.

18. The apparatus of claim 15, wherein the resources include the one or more demodulation fingers assigned to the demodulators.

19. The apparatus of claim 18, wherein the means for reallocating one or more demodulation fingers is further configured to reallocate from the first demodulator to the second demodulator based at least in part on a change in quality measurement of the frequency carrier related to the first demodulator and/or the second demodulator resulting in increased overall throughput.

20. A computer program product, comprising:
a non-transitory computer-readable medium comprising:
code for causing at least one computer to receive a plurality of signal-to-noise ratios (SNR) and/or packet error rates (PER) related to a plurality of carriers over which signals are received;

code for causing the at least one computer to compare the plurality of SNRs and/or PERs to determine an allocation of resources to a plurality of demodulators for demodulating the signals at an increased total throughput;

code for causing the at least one computer to allocate the resources to the demodulators according to the allocation; and code for causing the at least one computer to reallocate one or more demodulation fingers from a first demodulator to a second demodulator based at least in part on a projected change in overall throughput, wherein the projected change in overall throughput is projected based at least on a potential change in packet error rate (PER) of a frequency carrier related to the first demodulator.

21. The computer program product of claim 20, wherein the resources include the one or more demodulation fingers assigned to the demodulators.

22. The computer program product of claim 21, wherein said code for causing at least one computer to reallocate one or more demodulation fingers is further configured to reallocate from the first demodulator to the second demodulator based at least in part on a change in quality measurement of the frequency carrier related to the first demodulator and/or the second demodulator resulting in increased overall throughput.

23. The computer program product of claim 20, wherein said computer-readable medium further comprises code for causing at least one computer to allocate time-based decoding resources for decoding symbols received from demodulating the signals according to the allocation.

24. An apparatus, comprising:
a signal-to-noise ratio (SNR)/packet error rate (PER) measurer that measures SNR and/or PER of a plurality of frequency carriers over which signals are received; and
a finger allocator that compares the SNR and/or PER of the plurality of receivers to determine an appropriate allocation of demodulation fingers to a plurality of demodulators for demodulating the signals at an increased total throughput;
wherein the finger allocator is further configured to reallocate one or more demodulation fingers from a first demodulator to a second demodulator based at least in part on a projected change in overall throughput, wherein the projected change in overall throughput is projected based at least on a potential change in packet error rate (PER) of a frequency carrier related to the first demodulator.

25. The apparatus of claim 24, the finger allocator allocates the demodulation fingers to the demodulators according to the appropriate allocation.

26. The apparatus of claim 24, further comprising a rake receiver that simultaneously receives the signals over the plurality of frequency carriers.

27. The apparatus of claim 24, wherein the projected change in overall throughput is further projected based at least in part on a potential increase in SNR and/or decrease in PER of a frequency carrier related to the first demodulator based at least in part on the reallocation.

28. The apparatus of claim 24, wherein the projected change in overall throughput is further projected based at least in part on a potential decrease in SNR and/or increase in PER of a frequency carrier related to the second demodulator based at least in part on the reallocation.

29. The apparatus of claim 24, the resources are received from at least one of the plurality of demodulators assigned to demodulate one or more signals received over an equalizer.

30. The method of claim 1, wherein the projected change in overall throughput is further projected based at least in part on a potential increase in signal-to-noise ratio (SNR) and/or decrease in packet error rate (PER) of a frequency carrier related to the first demodulator based at least in part on the reallocation.

31. The method of claim 1, wherein the projected change in overall throughput is further projected based at least in part on a potential decrease in signal-to-noise ratio (SNR) and/or increase in packet error rate (PER) of a frequency carrier related to the second demodulator based at least in part on the reallocation.

* * * * *